UNITED STATES PATENT OFFICE 2,642,461

ORGANODIPHOSPHINE OXIDES AND SULFIDES

Rupert C. Morris, Berkeley, and John L. Van Winkle, San Lorenzo, Calif., assignors to Shell Development Company, Emeryville, Calif., a corporation of Delaware No Drawing. Application March 29, 1952, Serial No. 279,464

8 Claims. (Cl. 260—607)

This invention relates to the provision of novel organodiphosphine oxides and their sulfur analogs, and it is more particularly concerned with the discovery of a novel class of phosphorus-containing compounds having a structure which can be represented by the general formula

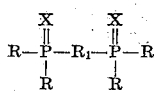

wherein the R's and $R_1$ represent organic radicals bonded to the adjacent phosphorus atoms by carbon-to-phosphorus bonds, and wherein the X's represent thio or oxo radicals. The compounds falling into this class have utility in a wide variety of applications and have been used, for example, as hydraulic fluids, as lubricant additives and as plasticizers.

Referring more particularly to the general formula described above, the compounds coming within the scope of the present invention are those wherein the various radicals attached to one of the phosphorus atoms are the same as those attached to the other phosphorus atom, though the R's attached to a given phosphorus atom can be the same as or different from one another.

The R's in the foregoing structural formula can be purely hydrocarbon radicals such as alkyl, alkenyl, cycloalkyl, aryl, alkaryl and/or aralkyl, for example, or they can be hydrocarbon groups of this character that are substituted by radicals such as chloro, bromo, alkoxy, amino, nitro or the like. Thus, the R's can be such groups as methyl, ethyl, propyl, isopropyl, butyl, hexyl, octyl, nonyl, dodecyl, heptadecyl, cyclopentyl, cyclohexyl, vinyl, allyl, methallyl, crotyl, phenyl, naphthyl, benzyl, phenylethyl, xyly, tolyl, cymyl, chloromethyl, p-chlorophenyl, p-nitrophenyl, 2-ethoxyethyl, chlorohexyl, aminoethyl, or the like, though preferably the R's are unsubstituted hydrocarbon radicals.

The radical represented by $R_1$ can be any divalent organic group which is bonded to the adjacent phosphorus atoms through carbon-to-phosphorus bonds, and can be any substituted or unsubstituted alkyl, alkenyl, aryl, alkaryl or aralkyl group representative radicals being methylene, dimethylene, trimethylene, hexamethylene, phenylene, biphenylene, naphthylene, 3-thiapentylene, xylylene, 3-oxabutylene, allylene, isopropenylene, or the like. In the preferred practice of the present invention, $R_1$ is an alkylene or a thia-, oxa- or aza-alkylene radical as, for example, —CH$_2$CH$_2$CH$_2$—, —CH$_2$CH$_2$CH$_2$—S—CH$_2$CH$_2$—, CH$_2$CH$_2$—O—CH$_2$CH$_2$—, or
—CH$_2$—N(CH$_3$)—CH$_2$—

Compounds which are representative of those falling within the scope of the present invention are (CH$_3$)$_2$PO—(CH$_2$)$_6$—PO(CH$_3$)$_2$
Tetramethylhexamethylenediphosphine oxide (CH$_3$)(C$_6$H$_5$)PO—(CH$_2$)$_5$—PO(CH$_3$)(C$_6$H$_5$)
Symmetrical dimethyldiphenylpentamethylenediphosphine oxide (C$_4$H$_9$)$_2$PO—CH$_2$—O—CH$_2$—PO(C$_4$H$_9$)$_2$
Tetrabutyl-2-oxa-1,3-propylenediphosphine oxide (CH$_3$C$_6$H$_4$)$_2$PO—CH$_2$CH$_2$—S—
CH$_2$CH$_2$—PO(CH$_3$C$_6$H$_4$)$_2$
Tetra-p-tolyl-3-thia-1,5-pentylenediphosphine oxide (C$_4$H$_9$)$_2$PO—CH$_2$CH$_2$—N(CH$_3$)—
CH$_2$—PO(C$_4$H$_9$)$_2$
Tetrabutyl-2-aza-2-methyl-1,4-butylenediphosphine oxide (C$_6$H$_5$CH$_2$)$_2$PO—(CH$_2$)$_6$—PO(C$_6$H$_5$CH$_2$)$_2$
Tetrabenzylhexamethylenediphosphine oxide (C$_2$H$_5$)(C$_3$H$_5$)PO—(CH$_2$)$_3$—PO(C$_2$H$_5$)(C$_3$H$_5$)
Symmetrical dimethyldiallyltrimethylenediphosphine oxide (C$_4$H$_9$)$_2$PO—C$_6$H$_4$—PO(C$_4$H$_9$)$_2$
Tetrabutyl-p-phenylenediphosphine oxide (CH$_3$)(C$_2$H$_5$)PO—CH$_2$CH=
CHCH$_2$—PO(CH$_3$)(C$_2$H$_5$)
Symmetrical dimethyldiethyl-2-buten-1,4-ylenediphosphine oxide (C$_6$H$_4$Cl)$_2$PO—(CH$_2$)$_6$—PO(C$_6$H$_4$Cl)
Tetra(p-chlorophenyl)hexamethylenediphosphine oxide (C$_6$H$_4$NO$_2$)$_2$PO—(CH$_2$)$_6$—PO(C$_6$H$_4$NO$_2$)$_2$
Tetra(p-nitrophenyl)hexamethylenediphosphine oxide (CH$_3$)$_2$PS—(CH$_2$)$_6$—PS(CH$_3$)$_2$
Tetramethylhexamethylenediphosphine sulfide (CH$_3$)(C$_6$H$_5$)PS—(CH$_2$)$_4$—PS(CH$_3$)(C$_6$H$_5$)
Symmetrical dimethyldiphenyltetramethylenediphosphine sulfide (C$_4$H$_9$)$_2$PS—CH$_2$CH$_2$—S—CH$_2$CH$_2$PS(C$_4$H$_9$)$_2$
Tetrabutyl-3-thia-1,5-pentylenediphosphine sulfide (C$_3$H$_7$)$_2$PS—CH$_2$CH$_2$—O—CH$_2$CH$_2$—PS(C$_3$H$_7$)$_2$
Tetrapropyl-3-oxa1,5-pentylenediphosphine sulfide (CH$_3$)$_2$PS—CH$_2$CH$_2$—N(CH$_3$)—CH$_2$—PS(CH$_3$)$_2$
Tetramethyl-2-aza-2-methyl-1,4-butylenediphosphine sulfide (C$_3$H$_6$Cl)$_2$PS—(CH$_2$)$_6$—PS(C$_3$H$_6$Cl)$_2$
Tetra(chloropropyl)hexamethylenediphosphine sulfide (C$_4$H$_9$)$_2$PO—CH$_2$CHClCH$_2$—PO(C$_4$H$_9$)$_2$
Tetrabutyl-2-chloro-1,3-propylenediphosphine oxide (C$_4$H$_9$)$_2$PO—CH$_2$C$_6$H$_4$—CH$_2$—PO(C$_4$H$_9$)$_2$
Tetrabutylxylyenediphosphine oxide (C$_4$H$_9$)$_2$PO—C$_6$H$_3$Cl—PO(C$_4$H$_9$)$_2$
Tetrabutyl-2-chloro-1,4-phenylenediphosphine oxide $(C_4H_5)_2PO-(CH_2)_6-PO(C_4H_5)_2$
Tetramethallylhexamethylenediphosphine oxide $(CH_3)_2PO-CH_2CH_2-SO_2-CH_2CH_2-PO(CH_3)_2$
Tetramethyl-3-thia-3,3-dioxo-1,5-pentylenediphosphine oxide The compounds of the present invention can be prepared by the use of any one of several methods known in the art. In one such method, a diphosphonate having the desired structure ($R_1$) between the phosphorus atoms is reacted with phosphorus pentachloride to convert the diphosphonate to the corresponding tetrachloride derivative; e. g.,

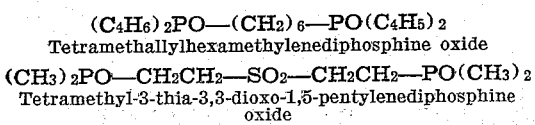
Bis-1,6-(dibutyl phosphino) hexane $[Cl_2PO-CH_2-CH_2-CH_2-]_2$
1,6-hexanediphosphonic tetrachloride The tetrachloride can then be converted to the desired diphosphine oxide by reaction with the appropriate Grignard reagent; e. g., $[(Cl_2PO-CH_2-CH_2-CH_2-]_2 + C_4H_9MgBr \rightarrow$
$[(C_4H_9)_2-PO-CH_2-CH_2-CH_2-]_2$
Tetrabutylhexamethylenediphosphine oxide When this method is employed the conventional practice is to add an ether solution of the chloride reactant, with cooling, to an ether solution containing an excess of the Grignard reagent, the resulting mixture then being heated for several hours to effect the desired reaction. The excess of Grignard reagent can then be decomposed and the solvent removed, leaving the crude product which can then be worked up in any desired manner. A modification of this method is to react a diphosphinic dichloride with the Grignard reagent, in which case only one organic group attaches to each phosphorus atom during the reaction.

Another method of preparing the compounds of this invention is by a practice of the Arbuzov reaction. In this method a diphosphinite is heated with an appropriate organo bromide, with the bromide compound formed as product being taken off as the reaction progresses; e. g.,

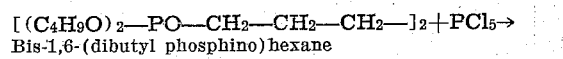

1,4-benzene-bis(ethyl butane-phosphinite)

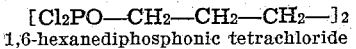

Tetrabutyl-1,4-phenylenediphosphine oxide

In still another method of preparation, appropriate diphosphine compounds can be oxidized, in either the presence or absence of an inert solvent, with a suitable oxidizing agent such as nitric acid, hydrogen peroxide or air (with a catalyst). This reaction is illustrated in the following equation:

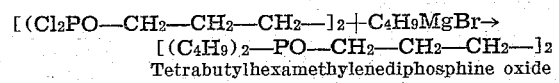

The sulfur analogues of the oxide compounds discussed above can be prepared by heating the corresponding oxides with sulfur. Alternatively, the diphosphine sulfides can be prepared by heating the corresponding diphosphine with sulfur instead of with an oxidizing agent.

The compounds of the present invention vary in character from hard solids to liquids, many of which are thick and highly viscous. All have high thermal stability and are resistant to attack by alkali or alkaline media generally even at temperatures as high as 300° C. Further, the present compounds are stable against attack by oxygen. In view of these and other desirable properties, these compounds, particularly those which exist in the liquid condition at normal temperatures, have proved to be well adapted for use as synthetic lubricants and as hydraulic fluids, for which purposes they can be used either with or without the employment of a suitable additive or diluent. The compounds of the present invention can also be useful employed as additives in synthetic or natural lubricating oils since they have the ability to improve the extreme pressure qualities of lubricants even when employed therein in concentrations as low as about 0.2% by weight.

The following examples show the formation of compounds which are illustrative of those coming within the scope of the present invention.

*Example I*

In this operation bis-1,6-(dibutylphosphono)-hexane was converted to the corresponding tetrachloride by treatment with phosphorus pentachloride, the acid chloride being recovered as a dark, viscous liquid that decomposed when distillation was attempted. The crude 1,6-hexanediphosphonic tetrachloride so produced was then dissolved in ether and added to a large excess of a cooled, ether solution of the Grignard reagent, butylmagnesium bromide. When addition was complete, the reaction mixture was heated with hot water at a temperature of about 40° C. for a period of 4 hours. The resulting reaction mixture was then treated with aqueous ammonium chloride, following which the ether layer was separated and the residual ether flash-distilled from the product. This product, which was determined by analysis to be tetrabutylhexamethylenediphosphine oxide and was recovered in 23.3% yield based on the charged chloride, was a solid melting at about 98.5 to 100° C. after being recrystallized from hot-acid octanes. The compound was insoluble in water.

*Example II*

In this operation the tetrabutylhexamethylenediphosphine oxide obtained by a practice of the operation described in the foregoing example is converted to the corresponding sulfide by heating with an excess of sulfur at a temperature between 139 and 140° C. for a period of one hour. The sulfur product obtained in this manner has substantially the same appearance and physical characteristics as the oxide.

*Example III*

In this operation, 100 grams of 1,4-benzylene-dibenzenephosphinic dichloride in 200 cc. of ethyl ether is added to a solution of 1000 grams of butylmagnesium chloride in 5000 cc. of ethyl ether, the mixture being stirred and maintained at a temperature of about 0° C. during the addition. The resulting mixture is then refluxed for a period of three hours, after which the excess Grignard reagent is neutralized with dilute hydrochloric acid. The ether layer is then removed and the balance of the ether remaining in the reactor is distilled off, leaving the product compound symmetrical dibutyldiphenyl-1,4-phenylenediphosphine oxide.

*Example IV*

The operation described in Example III is repeated, though in this case with 3-oxa-1,5-pentylenediphosphonic tetrachloride instead of 1,4-benzylenedibenzenephosphinic dichloride. Here the product obtained is tetrabutyl-3-oxa-1,5-pentylenediphosphine oxide. By heating the compound with sulfur as described in Example II, there is obtained tetrabutyl-3-oxa-1,5-pentylenediphosphine sulfide.

*Example V*

To a solution of 500 grams of phenylmagnesium bromide in ether there is added 25 grams of 3-thia-1,6-hexylenediphosphonic tetrachloride, also in ether solution, the Grignard reagent solution being stirred and cooled to about 5° C. during the addition period. The resulting solution is then refluxed for four hours, after which the ether layer is decanted and the remaining ether in the product is distilled off. On recrystallizing the product from hot-acid octanes there is recovered approximately 10 grams of tetraphenyl-3-thia-1,6-hexylenediphosphine oxide. Heating of this product with excess sulfur in a solution of carbon disulfide leads to the formation of the corresponding sulfide product compound.

*Example VI*

The process of the foregoing example is repeated, though with the use of 3-aza-3-ethyl-1,7-heptylenediphosphonic tetrachloride instead of 3-thia-1,6-hexylenediphosphonic tetrachloride. In this case there is obtained as product, the compound tetraphenyl-3-aza-3-ethyl-1,6-heptylenediphosphine oxide.

The invention claimed is:

1. A compound of the type having the general formula

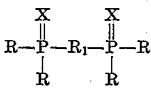

where the X's represent a radical selected from the group consisting of the oxo and the thio radicals, and the R's and $R_1$ represent organic radicals bonded to the adjacent phosphorus atoms through carbon-to-phosphorus bonds.

2. A compound of the type having the general formula

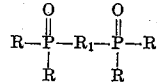

wherein the R's and $R_1$ represent hydrocarbon radicals.

3. A compound of the type having the general formula

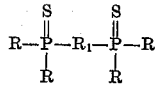

wherein the R's and $R_1$ represent hydrocarbon radicals.

4. The compound tetrabutylhexamethylenediphosphine oxide.

5. The compound tetrabutylhexamethylenediphosphine sulfide.

6. The compound symmetrical dibutyldiphenyl-1,4-phenylene diphosphine oxide.

7. The compound tetrabutyl-3-oxa-1,5-pentylene-diphosphine oxide.

8. The compound tetraphenyl - 3 - thia - 1,6-hexylenediphosphine oxide.

RUPERT C. MORRIS.
JOHN L. VAN WINKLE.

References Cited in the file of this patent

Beilstein, "Handbuch der Organischen Chemie," 4 Band, 4 Auflage (1922) p. 589.

Kosolapoff, "Organo-phosphorous Compounds," Wiley and Sons (1950) pp. 98–100.